Nov. 11, 1958    W. P. GALLAGHER ET AL    2,859,511
PROCESS OF STAKING A POST TO A MOUNTING

Filed July 8, 1953    3 Sheets-Sheet 1

Inventors:
William P. Gallagher,
Anthony D. Stolle
and Paul G. Bielik
By—
Attys.

Nov. 11, 1958  W. P. GALLAGHER ET AL  2,859,511
PROCESS OF STAKING A POST TO A MOUNTING
Filed July 8, 1953  3 Sheets-Sheet 2

Inventors:
William P. Gallagher,
Anthony D. Stolle
and Paul G. Bielik

Nov. 11, 1958    W. P. GALLAGHER ET AL    2,859,511
PROCESS OF STAKING A POST TO A MOUNTING
Filed July 8, 1953    3 Sheets-Sheet 3

Inventors:
William P. Gallagher,
Anthony D. Stolte
and Paul G. Bielik
By:— Brown, Jackson, Boettcher & Dienner
Att'ys.

United States Patent Office 2,859,511
Patented Nov. 11, 1958

2,859,511

PROCESS OF STAKING A POST TO A MOUNTING

William P. Gallagher, Anthony D. Stolle, and Paul G. Bielik, Chicago, Ill., assignors to International Register Company, Chicago, Ill., a corporation of Illinois Application July 8, 1953, Serial No. 366,842

8 Claims. (Cl. 29—432)

Our present invention relates to a process of staking electrical terminals or posts to supporting or mounting members.

The present application is a continuation-in-part, of our copending application, Serial No. 222,238, filed April 21, 1951, now issued as Patent 2,709,341.

It is an object of our present invention to provide a simple and inexpensive process for staking or piercing electrical terminals or posts and the like to supporting or mounting members.

Fundamentally, in carrying out our present invention, we contemplate forming each post with stem and shank parts of different widths and shoulders at the juncture of these parts. In the mounting members, to which the posts are to be staked, apertures are formed, one for each post, with the length of each aperture being less than the width of the shank of a post.

During our process, the post is centered relative to the mounting aperture with the post shoulders resting on one face of the mounting. Then pressure is applied for pressing the post transversely of the mounting to cause the shank to enter the aperture by the shoulders shearing off the mounting at the ends of the aperture. At the completion of our process, the post is securely positioned within the mounting.

Now, in order to acquaint those skilled in the art with the manner of employing the process of our present invention, we shall describe in connection with the accompanying drawings, a preferred embodiment of our present invention.

Figure 1:
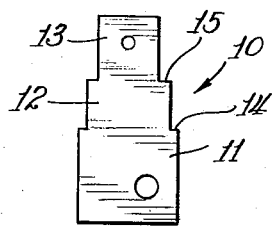
Figure 1 is an elevational view of a post member formed in accordance with our invention.

In practicing our present invention, we first form, as, for example, by blanking, post members 10 each having the general configuration shown in Figure 1. Each post member 10 is formed from a flat piece of metal, preferably brass, and comprises a base portion 11, a shank portion 12 and a stem portion 13, with the width of the shank portion being intermediate that of the base and stem portions. The base portion 11 serves to support either a switch contact or blade. A pair of shoulders 14 are defined at the junction of the base portion 11 and the shank portion 12, and a pair of shoulders 15 are defined at the junction of the shank portion 12 and the stem portion 13.

Figure 2:
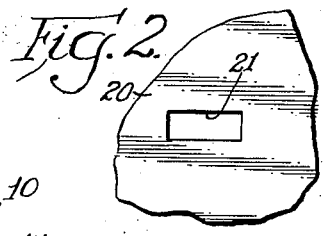
Figure 2 is a partial plan view of a mounting member showing an aperture formed therein in accordance with our invention.

One or more of the posts 10 are adapted to be staked to a mounting panel 20, a portion of which is shown in Figure 2, this mounting panel being preferably composed of glass polyester, laminated phenolic or other suitable rigid shearable insulating material. Preparatory to staking, one or more rectangular apertures 21, corresponding to the number of posts, are formed, as, for example, by punching, in the mounting member 20. The length of each aperture 21 is less than the width of the shank 12 but greater than the width of the stem 13, while the width of the aperture 21 is not less than the thickness of the post 10. Preferably, the length of the shank 12 of the post corresponds to the thickness of the mounting member.

In carrying out the process of our present invention, the stem portion 13 of the post 10 is centered in the mounting aperture with the post shoulders 15 resting on the face of the mounting 20. Pressure is then applied for pressing the post transversely of the mounting to cause the shank portion 12 to enter the aperture 21 by the shoulders 15 shearing chips out of the body of the mounting panel 20 at the ends of the aperture 21. At the completion of our process, the post 10 is securely positioned within the mounting member 20, by virtue of this chip shearing action creating slot-like extensions at the ends of the aperture 21, which slot-like extensions have a very tight fit over the post 10.

By way of exemplification, and not limitation, the post 10 may be formed from hard brass with a thickness of .045 inch, a stem width of .210 inch and a shank width of .281 inch. The mounting member 20 may be fabricated from insulating material of a thickness of .125 inch and with apertures therein having a length of .218 inch and a width of .109 inch. It will be understood by those skilled in the art that these dimensions may be varied in accordance with the thickness and hardness of the materials from which the posts and mounting members are formed, and the pressures employed during the staking process.

Figure 2A:
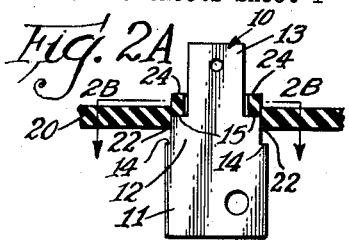
Figure 2A illustrates the step of the shearing shoulders on the terminal post shearing chips out of the body of the mounting panel.

In Figure 2A we have illustrated the step of the shearing shoulders 15 shearing chips out of the body of the mounting panel 20 to form the slot-like extensions 22 at the ends of the preformed mounting aperture 21, these chips being indicated at 24. This practice of utilizing the shank shoulders 15 as the die cutting elements for each terminal post positively assures that the slot-like extensions 22 will effect a tight, rigid anchorage of the shank portion 12 of that particular terminal post.

Figure 2B:
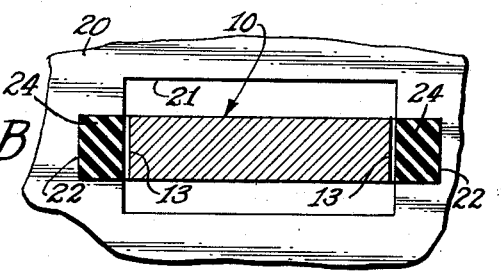
Figure 2B is a plan view on a greatly enlarged scale showing typical proportions of the terminal post and of the aperture in the mounting panel, corresponding to a section taken on the plane of the line 2B—2B of Figure 2A.
Figure 3:
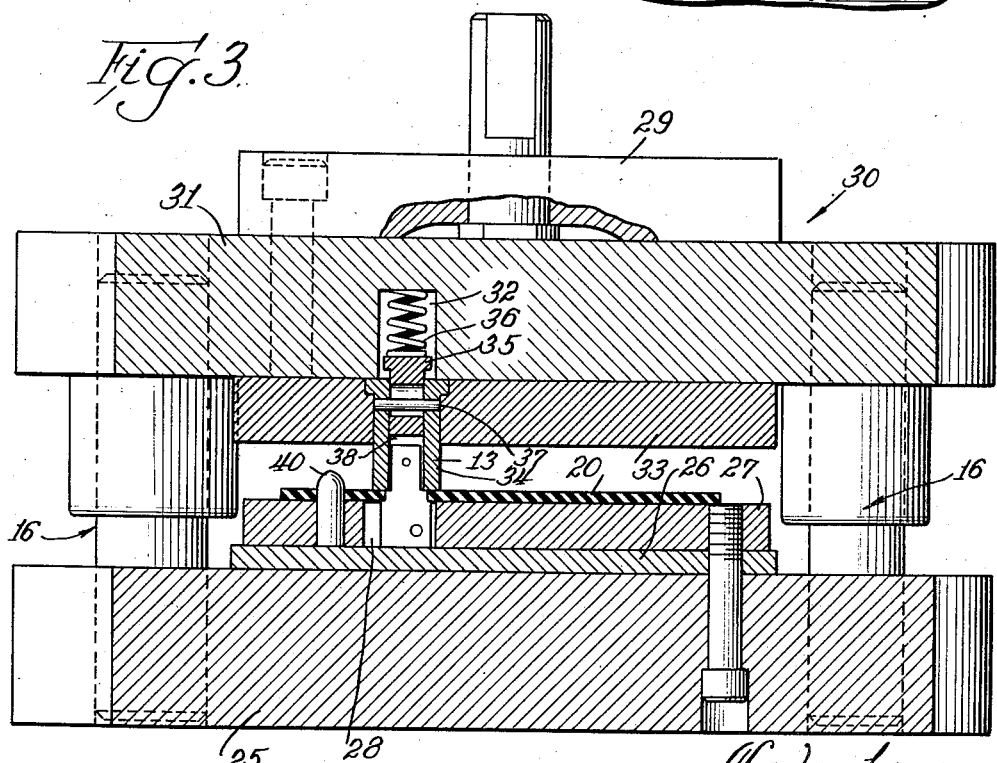
Figure 3 is a vertical sectional view of a staking mechanism suitable for practicing our present invention and is taken along the line 3—3 in Figure 4, looking in the direction indicated by the arrows.
Figure 4:
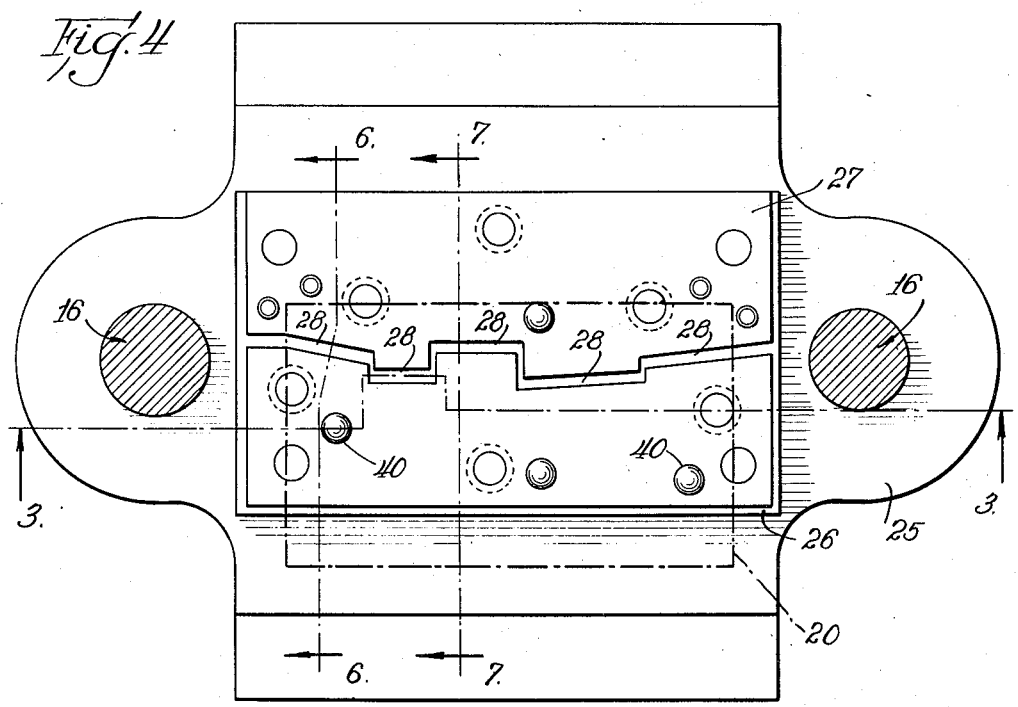
Figure 4 is a plan view of the lower half of the staking mechanism of Figure 3.
Figure 5:
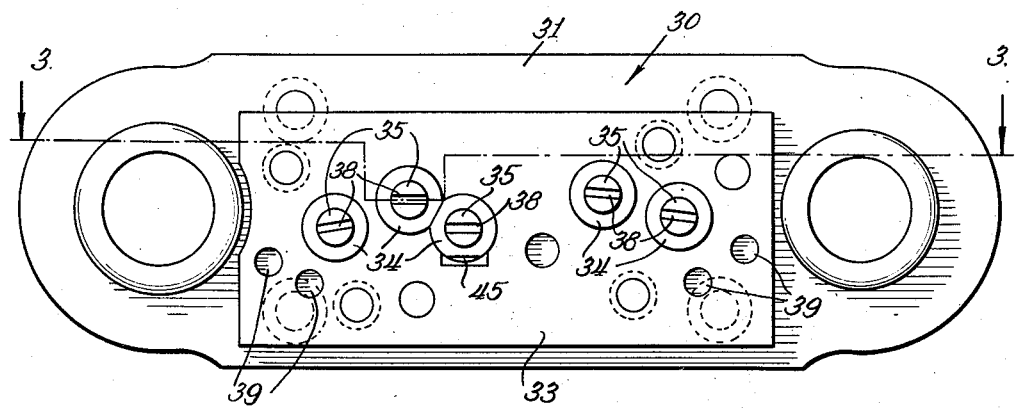
Figure 5 is an underside view of the upper half of the staking mechanism of Figure 3.
Figure 6:
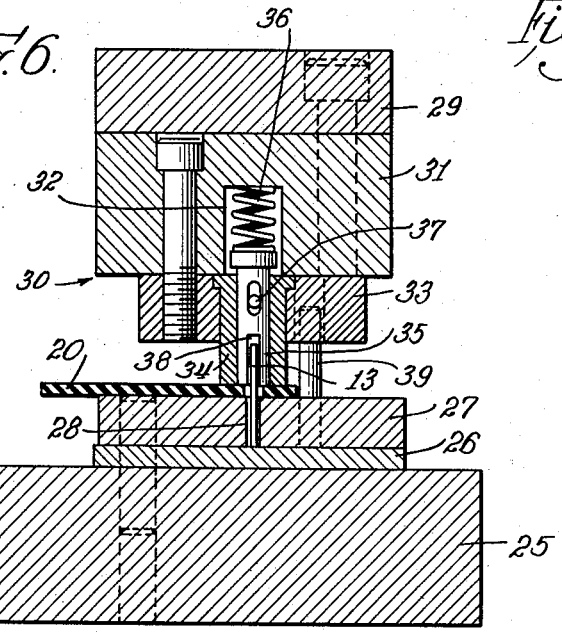
Figure 6 is a vertical sectional view of the staking mechanism, taken substantially along the line 6—6 in Figure 4, looking in the direction indicated by the arrows.

Figure 2B is a horizontal sectional view through Figure 2A, showing the chips 24 being sheared out of the mounting panel 20. Figure 2B is on a considerably enlarged scale, showing the above described typical proportions of the terminal post having a thickness of .045 inch, the preformed mounting aperture having a width of .109 inch, etc. Thus it will be seen that the preformed mounting aperture 21 is of substantially greater transverse width than the thickness of the terminal post 10. This is frequently advantageous for enabling the location of different terminal posts to be varied in different switch assemblies by variously positioning the terminal posts 10 adjacent to one side or the other of their respective mounting apertures 21. For example, different arrangements of switch contacts in different switch assemblies may call for slightly different mountings of one or more terminal posts of the group, as by locating the terminal post adjacent to either one side or the other of the mounting aperture 21, or intermediate the sides of the mounting aperture. Thus, the same mounting panels 20 having the same location of preformed mounting apertures 21 therein, may be employed in making up different switch assemblies, by virtue of this adjustable positioning of the terminal post 10 transversely of their respective mounting apertures 21.

One mechanism which is suitable for completing the staking or piercing, in the manner that we propose, is shown in Figures 3 through 7. Referring to these figures, it will be seen that the staking or piercing mechanism comprises a die shoe 25 which is suitably secured in a well-known manner to the bed of a press. Mounted to the die shoe 25 is a backing plate 26 and a two-piece die block 27 the adjacent faces of which define a plurality of substantially rectangular vertical openings 28.

Arranged above the die block 27 is a punch holder 29 which is attached to the ram of the press. Secured to the holder 29 is a punch assembly, indicated generally by the reference numeral 30, that comprises a pressure plate 31 having a plurality of vertical cylindrical openings 32 formed therein. During vertical movement of the pressure plate 31 relative to the die shoe 25, the members are guided on slide assemblies indicated generally by the reference numeral 16. Aligned with the openings 32, and held in position by a plate 33, are generally tubular punches 34. Slidably mounted within the bores of the punches 34 are cylindrical plungers 35 which are biased downwardly by springs 36 and limited in axial movement by transverse pins 37. Vertical slots 38 are formed in the lower ends of the plungers 35.

In the staking operation, a post member 10 is placed in each die block opening 28 with the stem portions 13 projecting upwardly. Then a mounting member 20 is inserted between the ends of the stems 13 and the plate 33 and located in approximate staking position by guide pins 39 with the apertures 21 of the mounting centered about the stem parts 13 and with the lower face thereof abutting the shoulders 15 of the post members 10. Exact positioning of the mounting 20 is accomplished through the use of locating pins 40 which are received in openings previously formed in the mounting 20 before the staking operation.

Figure 8:
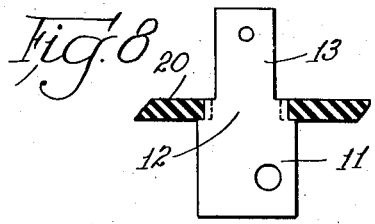
Figure 8 is a partial sectional view of a mounting showing a post staked thereto in accordance with the process of our present invention.

The press is operated for moving the ram and punch holder 29 downwardly. The lower ends of the plungers 35 are initially caused to engage the upper surfaces of the mounting member 20 for exerting a downward pressure thereon. With the backing plate 26 serving as a reaction member, the shoulders 15 of the posts 10 are caused to shear chips from the body of the mounting panel 20 at the ends of the apertures 21 for permitting the shank parts 12 to enter the apertures 21. This action of shearing chips from the body of the insulating panel 20 creates slot-like extensions at the ends of the aperture 21 which have a very tight fit over the post 10. During this phase of the process, the stem parts 13 are received in the vertical slots 38 of the plungers 35. The completed unit, with the post securely positioned in the mounting member, is shown in Figure 8.

The ram of the press may be raised for withdrawing the tubular punches 34 from their staking positions. During this movement, the spring biased plungers 35 serve to separate the punches 34 from the posts 10.

The above described mechanism for performing the staking process of our present invention is shown as accommodating five post members 10. It will be understood by those skilled in the art that this number may be increased or decreased in accordance with particular requirements without departing from our invention. It will further be understood that mechanisms other than that shown may be employed for carrying out our invention.

Figure 9:
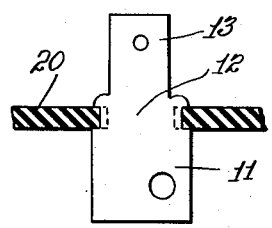
Figure 9 is a partial sectional view of a mounting showing a post staked thereto and reinforced in one manner.

When a post member is to be staked to a relatively thin mounting member, it may become desirable to impart additional rigidity to the completed assembly. If such is the case, the length of the shank of the post member should be greater than the thickness of the mounting so that after having been pressed through the mounting member it will project beyond the other face of the mounting. The edges of the shoulders projecting through the mounting member may then be peened over for providing additional reinforcement and anchorage. The added process step of peening may be carried out with the afore-described staking mechanism simply by changing the stroke of the ram to compensate for the decreased travel required of the tubular punches 34. A post member that has been peened into position is shown in Figure 9.

Figure 10:
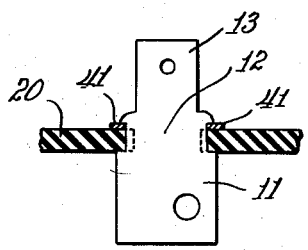
Figure 10 is a partial sectional view of a mounting showing a post staked thereto and reinforced in a modified manner.

Additional anchorage may further be secured by placing over the post member an apertured washer. After the shank of the post member has been pressed through the mounting member, with the shoulders projecting beyond the other face of the mounting and through the apertured washer, the edges of the shoulders may then be peened over at the washer. An assembly of this character is shown in Figure 10 with the washer being indicated by the reference numeral 41. The aperture in the washer 41 is of a width not less than the thickness of the post 10 and a length not less than the width of the shank 12.

Figure 7:
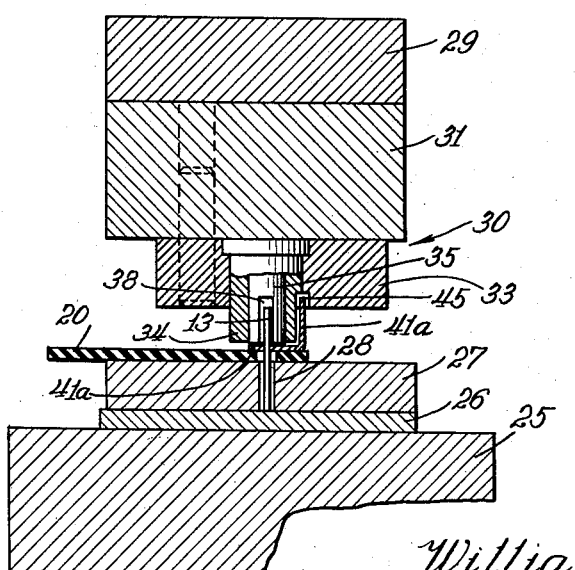
Figure 7 is a vertical sectional view of the staking mechanism, taken substantially along the line 7—7 in Figure 4, looking in the direction indicated by the arrows.

The washers 41 may be flat, as shown in Figure 10, or may be L-shaped, for example, as shown at 41a in Figure 7. The projecting leg of an L-shaped washer is suitable for use as a male plug or terminal to facilitate the establishment of an electrical connection with the associated post member. If an L-shaped washer is employed, the punch 34 and plate 33 may be suitably relieved as shown generally at 45 in Figures 5 and 7. It is to be understood that washers may be provided having any number of projecting legs and the punches 34 may be correspondingly relieved to facilitate the mounting of such washers. It is thus possible to selectively provide a plurality of male prongs at each staked post member.

Now, while we have shown and described what we believe to be a preferred embodiment of our present invention, it will be understood that various modifications and rearrangements may be made therein, without departing from the spirit and scope of our present invention.

We claim:

1. The process of staking a post to a mounting, comprising, forming a flat post with a shank part of less width than the base part and with a stem part of less width than the shank part with pairs of shoulders at the juncture of the shank and base parts and the shank and stem parts respectively, the pairs of shoulders being spaced apart longitudinally of the stem a distance greater than the thickness of the mounting, forming a rectangular aperture in the mounting of a length less than the width of the shank part of the post but greater than the width of the stem part, placing the post with the stem part in the aperture and the shoulders at the juncture of the shank and stem parts resting on one face of the mounting, pressing the post transversely of the mounting to cause the shank part to enter the aperture by the shoulders shearing off the mounting at the ends of the aperture and disposing the shoulders beyond the other face of the mounting with the other pair of shoulders resting against the one face of the mounting, and then peening over the edges of the first pair of shoulders to anchor the post to the mounting.

2. The process of staking a post having a shank portion to a mounting formed with an aperture therein of a width not less than the thickness of the post but of less length than the width of the shank, comprising, centering the post relative to the mounting aperture with the shank resting on one face of the mounting, placing a washer having an aperture therein over the aperture in the mounting at the other face of the mounting, pressing the post transversely of the mounting to cause the shank portion to enter and pass through the aperture by shearing off the mounting at the ends thereof, and then peening over the shank portion at the washer to anchor the post to the mounting.

3. The process of staking a post to a mounting, comprising, forming a post with a stem and shank parts of different widths with shoulders at the juncture of the stem and shank parts, forming an aperture in the mounting of a width not less than the thickness of the post but of less length than the width of the shank, placing the post with the stem part centered relative to the mounting aperture with the shoulders resting on one face of the mounting, forming a washer with an aperture therein of a width not less than the thickness of the post and a length not less than the width of the shank, placing the apertured washer about the post at the other face of the mounting, pressing the post transversely of the mounting to cause the shank part to enter the aperture by the shoulders shearing off the mounting at the ends thereof and disposing the shoulders beyond the other face of the mounting and through said washer, and then peening over the edges of the shoulders at the washer to anchor the post to the mounting.

4. The process of staking a post to a mounting, comprising, forming a flat post with a shank part of less width than the base part and with a stem part of less width than the shank part with pairs of shoulders at the juncture of the shank and base parts and the shank and stem parts respectively, the pairs of shoulders being spaced apart longitudinally of the stem a distance greater than the thickness of the mounting, forming a rectangular aperture in the mounting of a length less than the width of the shank part of the post but greater than the width of the stem part, placing the post with the stem part in the aperture and the shoulders at the juncture of the shank and stem parts resting on one face of the mounting, forming a washer with an aperture therein of a width not less than the thickness of the post and a length not less than the width of the shank, placing the apertured washer about the post at the other face of the mounting, pressing the post transversely of the mounting to cause the shank part to enter the aperture by the shoulders shearing off the mounting at the ends of the aperture and disposing the shoulders beyond the other face of the mounting with the other pair of shoulders resting against the one face of the mounting, and then peening over the edges of the shoulders at the washer to anchor the post to the mounting.

5. The process of staking a hard metal post having a shank of rectangular cross section to a mounting panel composed of rigid shearable insulating material having a mounting aperture therein of a width greater than the thickness of the post shank but of less length than the width of said post shank, which comprises inserting the post into said mounting aperture with said post shank abutting against one face of said mounting panel, and pressing the post transversely of said mounting panel to cause said rectangular post shank to enter the mounting aperture by shearing chips out of the body of said mounting panel so as to cut rectangular slot-like notches at the ends of said mounting aperture, which slot-like notches establish a very tight fit of the post shank within said mounting aperture.

6. The process of staking a flat hard metal post having a stem and shank parts of rectangualr cross section and of different widths with shearing shoulders at the juncture of the stem and shank parts, to a mounting panel composed of rigid shearable insulating material formed with a preformed rectangular mounting aperture therein of a width not less than the thickness of the post but of less length than the width of the shank, which comprises inserting the stem part of the post into the mounting aperture with the shearing shoulders abutting aganist one face of the mounting panel, and pressing the post transversely of the mounting panel to cause the shank part to enter the aperture by the shearing shoulders shearing rectangular chips out of the body of the panel at the ends of said mounting aperture so as to cut rectangular slot-like notches at the ends of the mounting aperture of a width equal to the thickness of the shank part, which slot-like notches have a very tight fit over the post.

7. The process of claim 6 wherein the preformed rectangular mounting aperture in the mounting panel is of a transverse width substantially greater than the thickness of said post, so as to enable said post to be positioned at different points transversely of the width of said mounting aperture prior to the staking of said post in said aperture.

8. The process of staking a flat hard metal terminal post to a mounting panel composed of rigid shearable insulating material comprising, forming the post with a stem part, a shank part and a base part all of rectangular cross section and of progressively increasing widths, and with a first pair of shoulders at the juncture of the stem and shank parts and with a second pair of shoulders at the juncture of said shank and base parts, forming a rectangular mounting aperture in the mounting panel of a width greater than the thickness of said post but of a length less than the width of the shank part, placing the post with the stem part extending through the mounting aperture and with the first pair of shoulders resting on one face of the mounting panel, the greater width of said mounting aperture enabling said post to be positioned at different points transversely of the width of said aperture, pressing the post transversely of the mounting panel to cause the shank part to enter the mounting aperture by the action of the first pair of shoulders shearing rectangular chips out of the body of the mounting panel to form slot-like notches at the ends of the mounting aperture, and forcing the shank portion through the mounting panel until the second pair of shoulders are brought to bear against the latter face of the mounting panel.

References Cited in the file of this patent

UNITED STATES PATENTS

| | | |
|---|---|---|
| 521,825 | Shipe | June 26, 1894 |
| 868,067 | Berry | Oct. 15, 1907 |
| 1,157,666 | Bennett | Oct. 26, 1915 |
| 1,365,151 | Burke | Jan. 11, 1921 |
| 1,657,208 | Greaves | Jan. 24, 1928 |
| 1,796,852 | McDonough | Mar. 17, 1931 |
| 2,236,180 | Kost | Mar. 25, 1941 |
| 2,561,638 | Richardson | July 24, 1951 |
| 2,663,270 | Friedly | Dec. 22, 1953 |